(12) United States Patent
Wageman et al.

(10) Patent No.: US 8,467,504 B1
(45) Date of Patent: Jun. 18, 2013

(54) MESSAGE-INDICATION TESTING

(75) Inventors: Anthony James Wageman, Lee's Summit, MO (US); Tom Sladek, Overland Park, KS (US); Diane Elaine Carder, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 262 days.

(21) Appl. No.: 13/073,224

(22) Filed: Mar. 28, 2011

Related U.S. Application Data

(63) Continuation of application No. 12/767,155, filed on Apr. 26, 2010, now Pat. No. 7,945,027, and a continuation of application No. 11/255,747, filed on Oct. 21, 2005, now Pat. No. 7,738,636.

(51) Int. Cl.
*H04M 1/64* (2006.01)
(52) U.S. Cl.
USPC .................................... 379/88.12; 379/1.02

(58) Field of Classification Search
USPC .............. 379/1.01, 1.02, 27.01, 27.02, 26.01, 379/29.01, 88.12
See application file for complete search history.

(56) References Cited

U.S. PATENT DOCUMENTS

| 2002/0067807 A1* | 6/2002 | Danner et al. | 379/88.12 |
| 2005/0180548 A1* | 8/2005 | Moore | 379/88.12 |
| 2005/0278436 A1* | 12/2005 | Sharma et al. | 709/223 |

\* cited by examiner

*Primary Examiner* — Olisa Anwah

(57) ABSTRACT

A computer-implemented method and system to remotely test message-waiting notifications over a communications network is provided. The method includes receiving broadband signaling from a voicemail platform; converting the broadband signaling to narrowband signaling; and transmitting the narrowband signaling, which generates status notifications, and transmits the status notifications to a remote test location. The system includes a switching element that routes the broadband signaling generated by the voicemail platform. The switching element routes the broadband signaling to a message processing component that executes code that searches a message-waiting-notification database to generate appropriate tones based on the broadband signaling received from the switching element.

20 Claims, 10 Drawing Sheets

MESSAGE-INDICATION TESTING

CROSS-REFERENCE TO RELATED APPLICATIONS

This application is a continuation of U.S. application Ser. No. 12/767,155 filed Apr. 26, 2010, which is a continuation of U.S. application Ser. No. 11/255,747 filed Oct. 21, 2005 and issued Jun. 15, 2010 as U.S. Pat. No. 7,738,636, which are all incorporated in their entireties by reference herein.

STATEMENT REGARDING FEDERALLY SPONSORED RESEARCH OR DEVELOPMENT

Not applicable.

TECHNICAL FIELD

Embodiments of the invention relate to the field of testing message-waiting notifications.

BACKGROUND

Currently, local or residential message-waiting notification is provided by a local carrier utilizing either audible or visual notifications. Audible notifications are generated by a switch provided by the local carrier, when a telephone receiver is removed from a telephone base. When a message is waiting for the customer, the switch applies the audible notification followed by dial tone to the telephone receiver, if the telephone receiver is "off-hook." The audible notifications include stutter tone, which uses dial tone frequencies with a cadence of one-tenth of a second on, one-tenth of a second off, repeated ten times. Thus, if a customer has a message waiting, when she picks up the phone to make a call, she'll hear a series of tones that indicate an unheard voice message before she hears normal steady dial tone.

Similarly, a customer's handset that includes a LED (lamp) may blink when a new message is waiting. Textual data may also be provided to a telephone display. The visual notifications may be delivered to the telephone from the switch as a coded burst of data in American Standard Code for Information Interchange (ASCII) format. The customer receives the visual notification without placing the telephone in an off-hook condition. When a message is waiting for the customer, the ASCII data is sent to the telephone using Frequency Shift Keying (FSK) signaling to instruct the telephone to display text information or to illuminate the lamp. When no messages are available for the customer, the switch does not generate the visual or audible notifications.

Audible notifications may be tested remotely without customer interference, but testing visual notifications require a technician to be sent to the customer's location. When a message is waiting for a specified telephone, the audible notification may be tested remotely by allowing a technician to dial into a remote testing device, authenticating the technician at a remote testing device, selecting a port associated with the specified telephone and generating an "off-hook" condition. After the remote testing device generates the "off-hook" condition, the remote testing device receives the stutter tone indicating that a message is waiting and plays stutter tone to the technician.

On the other hand, remote testing for visual notification is intrusive to the customer. Either the technician calls the customer and asks whether the lamp or display is operational or the technician is required to visit the customer's location and perform a visual check of the lamp or display to decide whether the visual notifications are operating properly. This is inefficient and increases costs associated with providing visual notifications. Accordingly, there is a need to, among other things, be able to remotely confirm that visual message-waiting notifications are working as intended.

SUMMARY

Embodiments of the invention are defined by the claims below. In one embodiment, a method and system is provided for remote testing of message-waiting notifications over a communications network. The message-waiting notifications include audible and visual notifications. A visual message-waiting notification is received, and a confirmation indication is requested to test presentation of visual message-waiting notifications on a target device. A status notification is generated in response to the request for the confirmation indication.

In a first aspect, message-waiting notifications are generated based on message-waiting signals. The message-waiting signals are processed to determine the appropriate cadences to generate. The cadences generated specify whether a message-waiting notification is audible, visual or both.

In a second aspect, broadband signaling is generated to represent the message-waiting signaling that specifies a notification type or state. The broadband signaling may be converted to narrowband signaling when necessary to allow legacy devices to receive the appropriate notifications.

In a third aspect, a test server remotely logs message-waiting notifications, when a voice message is deposited in a voice mailbox. Call setup information for broadband residential phone numbers is generated and voice messages are deposited for each broadband residential phone number associated with a voice mailbox. Broadband messages are generated to inform the broadband residential equipment of the voice message and the messages are processed to determine whether to transmit the messages to a test-management server.

In a fourth aspect, a remote testing system includes a voicemail platform and a switching element. The voicemail platform receives voice messages and generates broadband message-waiting notifications. The broadband message-waiting notifications are processed by the switching element to generate narrowband tones.

BRIEF DESCRIPTION OF THE SEVERAL VIEWS OF THE DRAWINGS

The embodiments of the invention are described in detail below with reference to the attached drawing figures, which are incorporated by reference herein and wherein.

DETAILED DESCRIPTION

Figure 1:
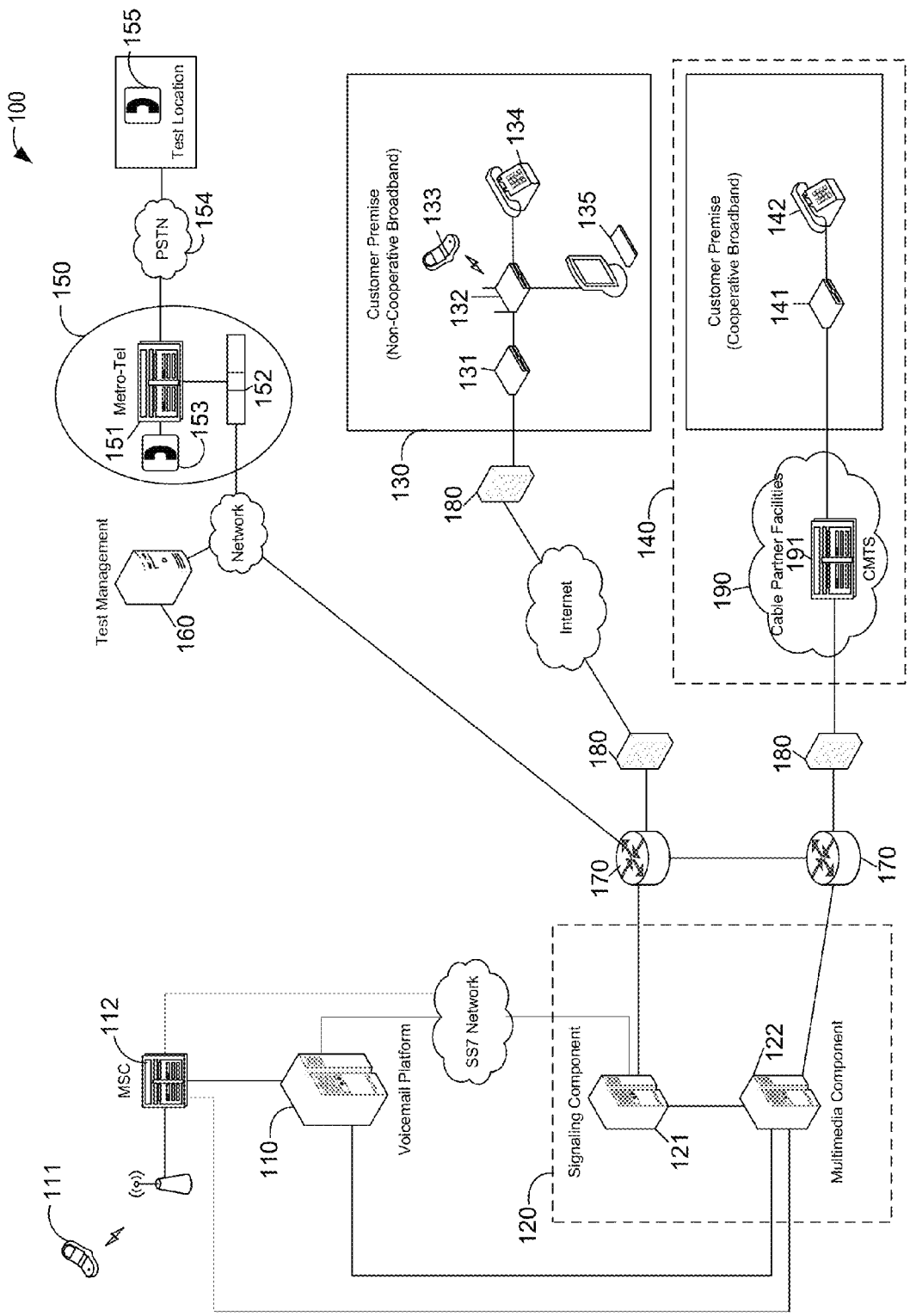
FIG. 1 is a network diagram illustrating an overview of a communications network in accordance with embodiments of the invention.

Embodiments of the invention provide a method of presenting message-waiting notifications across a communications network. A remote testing location processes message-waiting notifications and informs a technician whether the message-waiting notification associated with a customer number is operating according to a service profile associated with the customer number. Additionally, an automated dialer may deposit messages in voice mailboxes. After depositing the messages, message-waiting notifications are generated and the message-waiting notifications are processed to determine whether remote logging is enabled. When remote logging is enabled, the message-waiting notifications are logged at a test-management server. Accordingly, embodiments of the invention test message-waiting notifications to determine whether the message-waiting notifications are operating properly.

Acronyms and Shorthand Notations

Throughout the description of embodiments of the invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the invention. The following is a list of these acronyms:

| | |
|---|---|
| ATM | Asynchronous Transfer Mode |
| CMTS | Cable Modem Termination System |
| EMTA | Enhanced Multimedia Terminal Adapter |
| IAD | Integrated Access Device |
| MG | Media Gateway |
| MGC | Media Gateway Controller |
| MWI | Message Waiting Indication |
| NCS | Network Based Call Signaling |
| PSTN | Public Switched Telephone Network |
| SIP | Session Initiated Protocol |
| SS7 | Signaling System 7 |
| TCAP | Transaction Capabilities Application Part |
| TN | Telephone Number |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

As one skilled in the art will appreciate, embodiments of the invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Non-transitory computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media, which are by nature non-transitory.

Non-transitory computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Non-transitory communications networks include network elements that communicate via communication pathways. The network elements include device such as, switches, servers, and signaling elements. The network elements utilize communication media to transfer information among network elements on the communication pathways. Communications networks may be organized as cooperative networks or noncooperative networks. Cooperative networks have groups of providers such as, cable-television providers, satellite-programming providers, wireless-telephony providers and local or long-distance providers. The cooperative networks allow secure sharing of infrastructure among the groups of providers in the cooperative network. The cooperative networks utilize e-bonding to connect electronic interfaces between the providers included in the groups.

In one embodiment, e-bonding or peering allows voice or other communication providers to interface with a cable or satellite provider's network to administer voice and video transmissions and communication services over each partnered network. Moreover, partnered providers can allow other partners to share one another's infrastrucutre. As will be explained in greater detail below, embodiments of the invention allow cable, satellite or telephony companies to provision their system for testing message notifications.

A noncooperative network is composed of species networks whose owners do not seek to work together. An example of a noncooperative network arrangement may include a broadband-telephone-service provider, such as, voice over packet (VOP)—e.g., a voice-over-internet-protocol (VoIP), voice over ATM, etc.—provider, and a cable television (CATV) provider. The CATV provider may provide broadband service via cable modem. The VoIP provider may provide telephony service, via a digital-phone modem. Although both networks may be employed, the VoIP provider does not necessarily work together with the CATV provider to provide services to a customer.

A communications network capable of performing message-waiting notifications includes a voicemail platform, switching elements, and a testing device. The voicemail platform stores voice messages in voice mailboxes for retrieval by a network element, such as a telephone or smartphone. The switching elements route signaling information generated by the voicemail platform to the network elements in the communications network. The network elements process the signaling information to generate indications, which notify a customer that a voice message is waiting in the voice mailbox. The testing device is utilized to test the message-waiting notifications to ensure that the customer is notified of the waiting voice message. A technician may utilize the testing device to determine whether the voicemail platform is operating properly. Furthermore, the technician is able to determine whether a customer is receiving MWI signaling and the correct type of MWI without having to physically travel to the location of the customer equipment.

FIG. 1 is a network diagram illustrating an overview of a communications network 100 in accordance with embodiments of the invention. The communications network 100 includes a voicemail platform 110, switching elements 120, and a testing device 150. The voicemail platform receives voice messages and stores the voice messages to allow customers that contract for voicemail services to retrieve the messages. The voicemail platform 110 stores the voice messages and generates MWI signaling to alert a customer that a message is available. The MWI signaling may be communicated to the switching elements 120 through a signaling system seven (SS7) protocol. The switching elements 120 include a media gateway (MG) 122 and a media gateway controller (MGC) 121. The MG 122 routes voice, video, text or graphic data associated with a communication session. The MGC 121 routes the signaling data associated with the communication session. In an embodiment, the MGC 121 and MG 122 comprise a softswitch that has a database that tracks information about MWI signals for customers contracting to receive audible and visual notification services. The softswitch provides stutter dial tone, or visual indications, such as text, pictures or flashing lights, to the customers based on terms of the contract with a carrier, such as Sprint.

The testing device 150 includes a remote calling device 151 and an integrated access device (IAD) 152. An illustrative remote calling device 151 may be a Metro-Tel CTT device (but any device that offers similar functionality may be used). The Metro-Tel CTT device includes a number of ports, each of which connects to an assigned port on IAD 152. The Metro-Tel CTT receives authentication information from a technician, verifies the authentication information and selects a port specified by the technician after the authentication information is verified. The IAD 152 communicates with the remote calling device 151 to inform the technician whether the message-waiting notifications are operating properly. The IAD 152 receives MWI signaling that originated from the voice mail platform 110 and processes the MWI signaling to inform the technician whether the notification is audible, visual or both.

In an embodiment of the invention, a test-management server 160 logs MWI signaling sent to customer equipment, such as enhanced multimedia adapters (EMTA). The MWI signal may be directly transmitted to the test management server 160 from the voicemail platform 110 or the EMTA may forward the MWI signals to the test management server 160 after the EMTAs receive the MWI signals.

The customer equipment may include network elements in cooperative or noncooperative broadband networks 130 and 140. The noncooperative broadband network 130 may include network elements that do not benefit from a peering relationship with network elements provided by the carrier. The network elements in the noncooperative network may include a broadband modem 131, which receives the MWI signaling from the voicemail platform 110. The broadband modem 131 is coupled to a wireless router 132 that enables communication with network elements 133-135. The voicemail platform 110 communicates the MWI signaling information to the noncooperative networks 130 utilizing a session-initiated protocol (SIP). The SIP messages are received by the broadband modem 131 and processed by the wireless router 132, having telephony capabilities, to generate the proper notifications for network elements such as a wireless phone 133, telephone 134, or a computer 135. The notifications may include audible and visual notifications. In an alternate embodiment, the broadband modem 131 and wireless router 132 may consist of one physical device having telephony capabilities.

The cooperative network 140 includes a cable modem termination system (CMTS) 191, a cable modem 141 and a telephone 142. The cooperative network 140 may include carrier infrastructure peered with cable infrastructure. The carrier infrastructure may include facilities optimized from voice communications while the cable infrastructure include facilities optimized for multimedia communications. The peering or partnering of these infrastructures allows services provided on a carrier's network to be implemented or transported on the cable network. In an embodiment of the invention, the partnered networks utilize network based call signaling (NCS). The NCS messages are utilized to communicate the MWI signaling that originated from the voicemail platform 110 to the cooperative network 140. The NCS messages are received at the CMTS 191 and processed by the cable modem 141 to generate either audible or visual notifications on the telephone 142. In an alternate embodiment, SIP messages may be sent from the voicemail platform to the customer premise.

The communications transmitted between the carrier facilities 110 and 120, the noncooperative networks 130, cooperative networks 140 and cable partner facilities 190 are securely transmitted through firewalls 180 via packet switches or routers. The added layer of security provides secure information exchange and ensures that the information communicated on the networks are received and processed by the proper recipients. The communications network 100 illustrated in FIG. 1 is exemplary and other configurations are within the scope of the invention.

Message-waiting notifications generated by a voicemail platform are communicated to an IAD to allow a remote technician to determine whether the message-waiting notifications are being received by the customer equipment. The IAD communicates with a remote calling device to inform the technician that notifications, audible, visual or both, are properly communicated to the customer-premise equipment. The IAD is able to process both SIP and NCS messages and generates an appropriate indication for a technician testing the message-waiting notifications.

Figure 2:
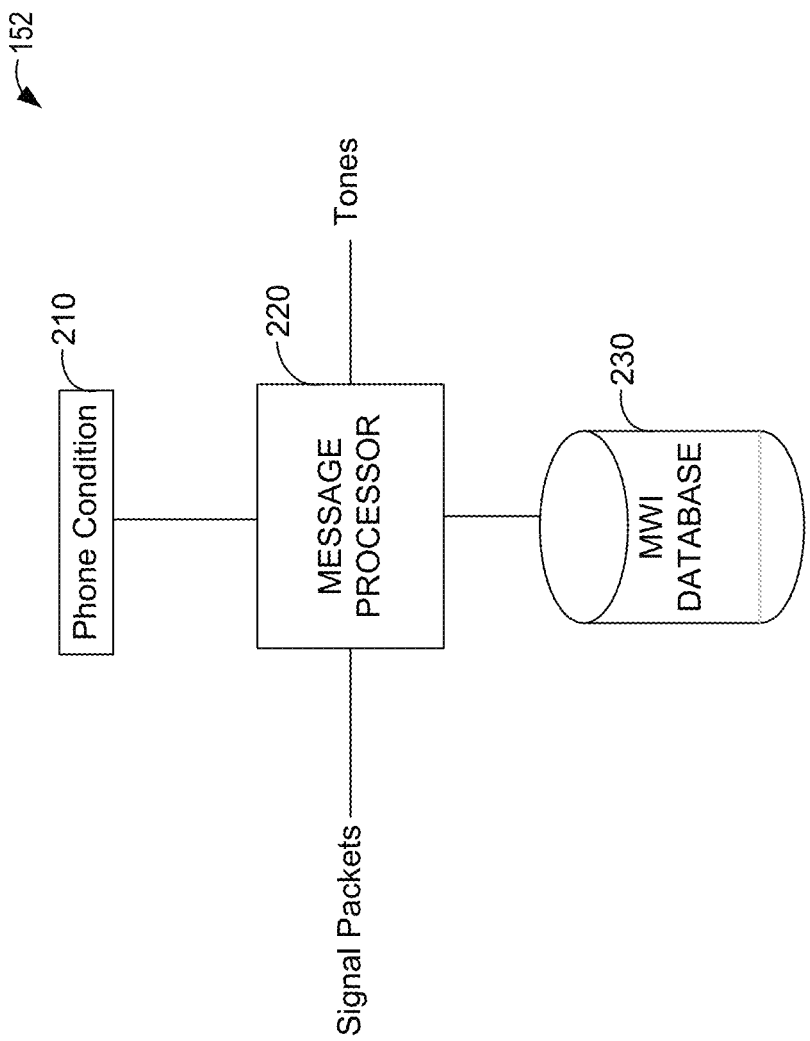
FIG. 2 is a component diagram illustrating components of an Integrated Access Device (IAD) in accordance with embodiments of the invention.

FIG. 2 is a component diagram illustrating components of the IAD 152 in accordance with embodiments of the invention. The IAD 152 includes a message processor 220, and a MWI database 230. The IAD 152 generates cadence tones based on the signaling packets received from the network. The message processor 220 executes logic that generates responses to the signaling packets. The logic processes the signaling packets to determine type and status associated with the signaling packets. The logic enables the message processor 220 to detect a phone condition 210 by determining whether an off-hook condition is received by the IAD 152. When the off-hook condition is received an appropriate cadence tone is generated in response to the signaling packets. The signaling packets received by the IAD 152 include SIP and NCS messages that encapsulate message-waiting-notification data. The SIP and NCS messages are configured to provide the message processor with the status and type data. The type of data specifies whether the message is visual, audible or both, and the status data specifies whether the notifications are on or off. The MWI database stores a predetermined cadence for visual and audible notifications. When the message processor 220 determines the status and type of message-waiting notification, the MWI database 230 is queried to generate an appropriate cadence tone. For instance, the cadence tones generated by the IAD 152 for visual notification may be a dial tone with a twentieth of a second on and a twentieth of a second off repeated 5 times. The tones generated for audible notifications may have a similar cadence repeated 10 times. Moreover, when a customer is provisioned with both visual and audible notifications, the cadence may be repeated 15 times. The cadence tones utilized are sent to a remote technician to allow the technician to determine whether the MWI signals are generated according a customer contract.

Figure 3:
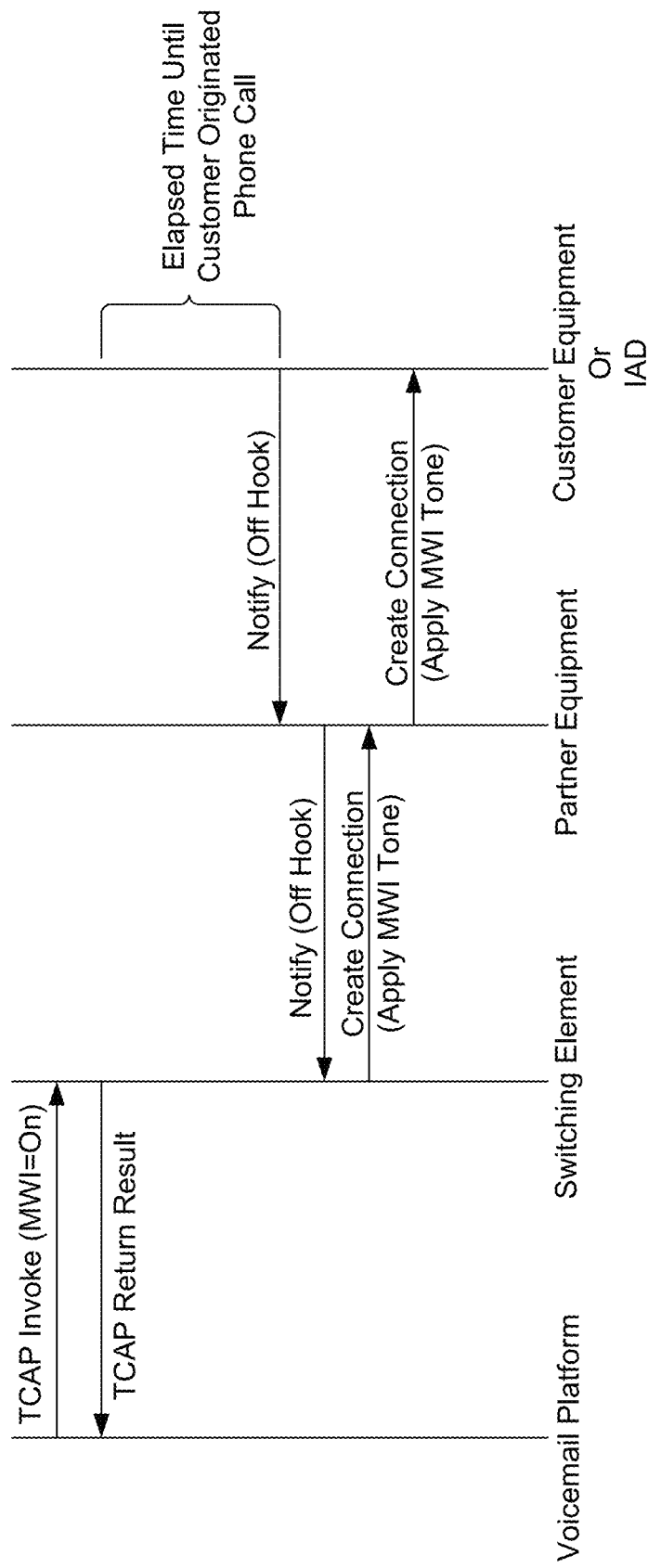
FIG. 3 is a Network Based Communication Signaling (NCS) message diagram illustrating communication messages associated with audible message-waiting notifications in accordance with embodiments of the invention.
Figure 4:
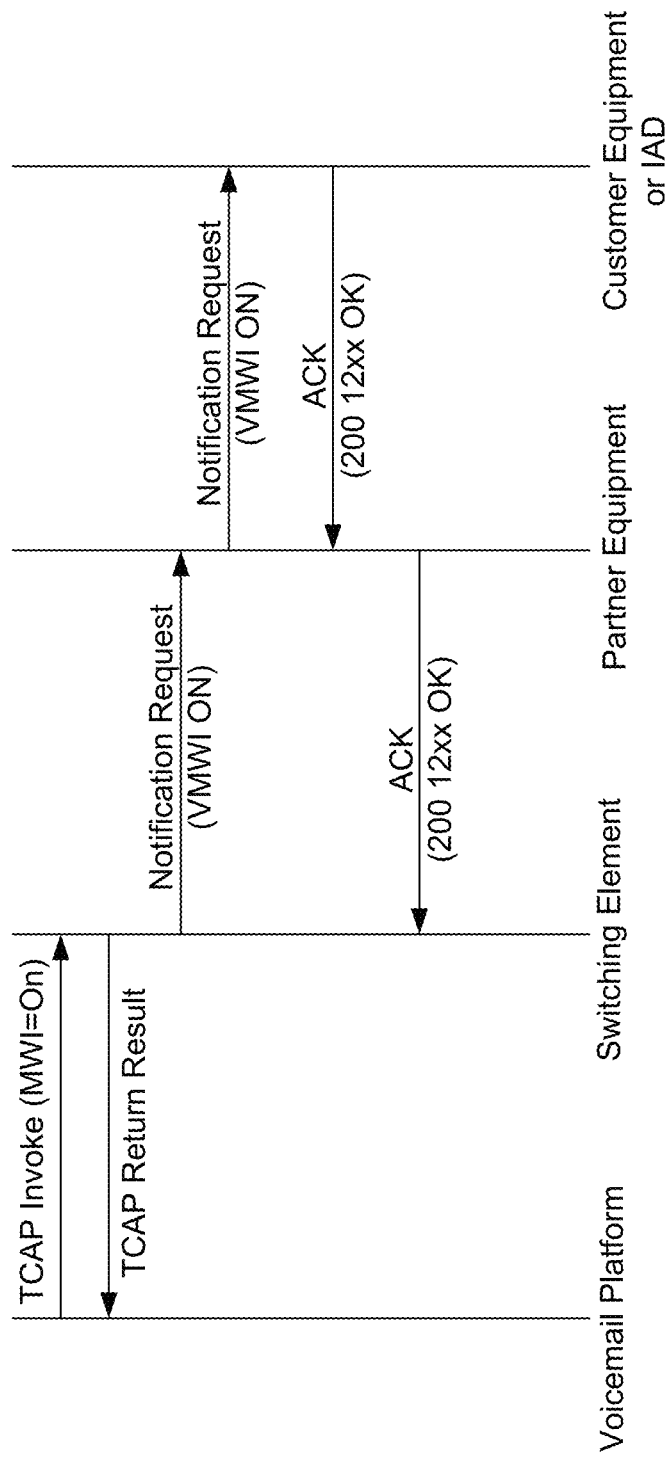
FIG. 4 is a NCS message diagram illustrating communication messages associated with visual message-waiting notifications in accordance with embodiments of the invention.

The message-waiting notifications are generated and routed to the IAD 152 and customer equipment, such as EMTAs. The customer equipment in the cooperative network and noncooperative network receives the message-waiting notifications in NCS and SIP, respectively. Alternatively, SIP could also be used in a cooperative network if agreed to by partnering companies. With reference to FIGS. 3 and 4, exemplary communication messages in a cooperative broadband network illustrate exchanges that occur between a voicemail platform and customer equipment. FIG. 3 is a NCS message diagram illustrating communication messages associated with audible message-waiting notifications, and FIG. 4 is a NCS message diagram illustrating communication messages associated with visual message-waiting notifications in accordance with embodiments of the invention. In FIG. 3, the voicemail platform generates a SS7 Transaction Capabilities Application Part (TCAP) indicating that a new voice message is waiting in a voice mailbox associated with a customer. The voicemail platform sends a SS7 TCAP Invoke message, to a switching element, such as, a MGC. The switching element receives the TCAP Invoke message and responds with a TCAP Return Result message that includes the result of the TCAP Invoke message. The result may inform the voicemail platform that the switching element successfully received the TCAP Invoke message. When the customer associated with the voice mailbox is provisioned to receive audible message-waiting notification, the switching element waits for an off-hook condition to be generated by the customer IP telephony equipment, such as, an EMTA, cable or satellite set-top box, or telephone. The customer equipment generates a NCS Notify message, when the customer takes the phone off hook. The NCS notify message is communicated to the partner equipment, such as, a CMTS. The partner equipment forwards the NCS notify message to the switching element. In turn, the switching element generates a create connection message that specifies the appropriate cadence tone to apply to the customer equipment. The create connection message is transmitted to the CMTS and received by the customer equipment to inform the customer that a voice message is waiting in the voice mailbox. Additionally, an IAD may receive the off-hook condition for a remote calling device and in response to the off-hook condition generate an appropriate cadence. The IAD generates cadence tones to inform a technician of the types of notification that are being received. Accordingly, the technician may verify that the correct cadence tones are generated according to contract provisions with regard to visual or audible message-waiting notifications.

In FIG. 4, similar communication messages are generated when the customer is provisioned for visual message-waiting notifications. However, with visual notifications, the switching element may set a state of the customer equipment to "messages waiting." Moreover, in response to the TCAP Invoke message, the switching element may immediately send a Notification Request message instructing the customer equipment to visually indicate that a message is waiting. The CMTS forwards the Notification Request message to the customer equipment, which generates an appropriate visual indication, such as blinking lights, a text message, image, video, or any other suitable visual notification. After the voice message is heard by the customer, the voicemail platform notifies the customer equipment that no messages are available. To turn the visual and audible message-waiting notification off, the message delivery path is the same. The voicemail platform communicates an SS7 TCAP Invoke message to the switching element specifying that no messages are waiting. For audible message-waiting notifications, the switching element may change the state associated with customer equipment to "no messages" without generating a notification to the customer equipment. For visual message-waiting notifications, the switching element will immediately send a Notification Request message setting the visual indication to an off state. The Notification Request message is communicated to the customer equipment and the visual indication is turned off.

In an embodiment of the invention, the switching element communicates with a security element, such as a SBC using the NCS protocol, and the SBC, in turn, communicates with the partner equipment. Additionally, the SBC may perform a network address translation (NAT) on the audible or visual message-waiting notification messages prior to forwarding the messages to the partner equipment.

Figure 5:
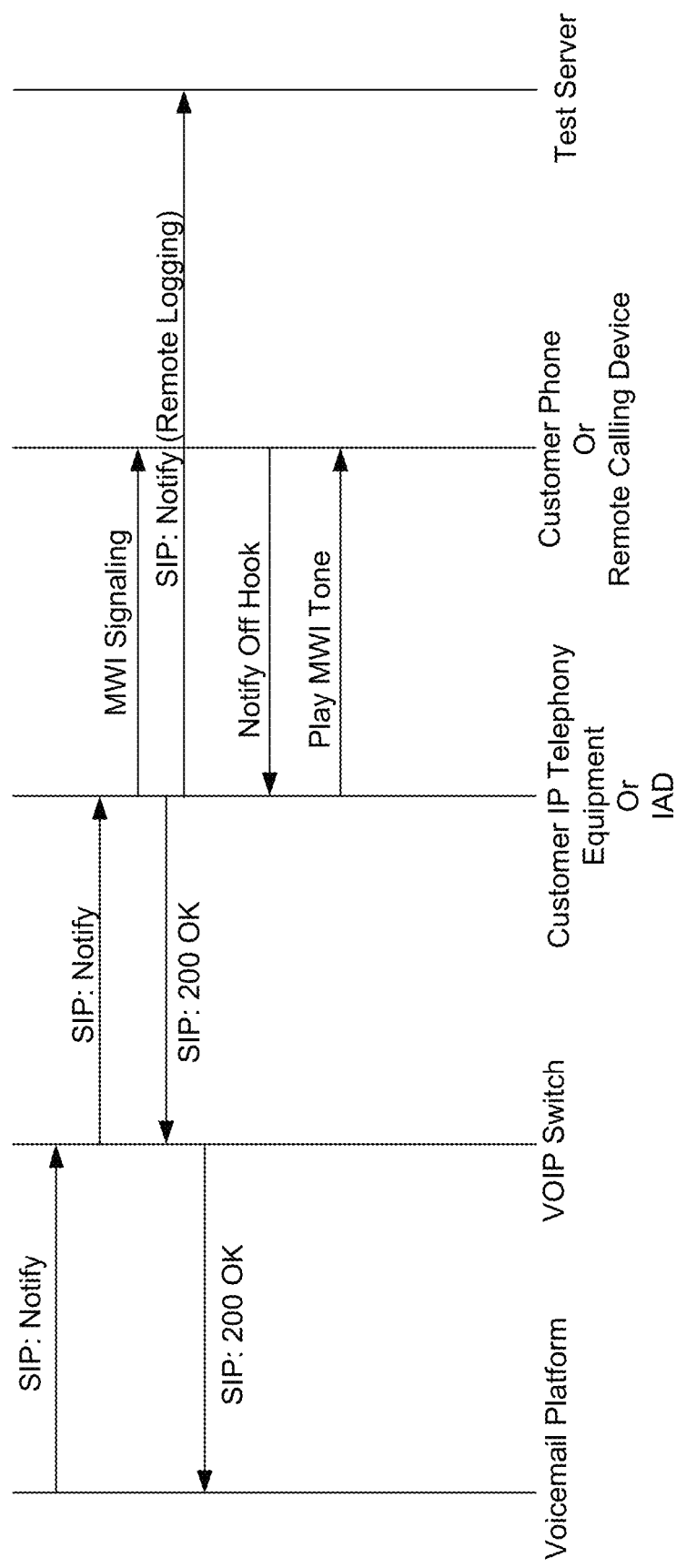
FIG. 5 is a Session Initiated Protocol (SIP) message diagram illustrating unsolicited communication messages associated with message-waiting notifications messages in accordance with embodiments of the invention.
Figure 6:
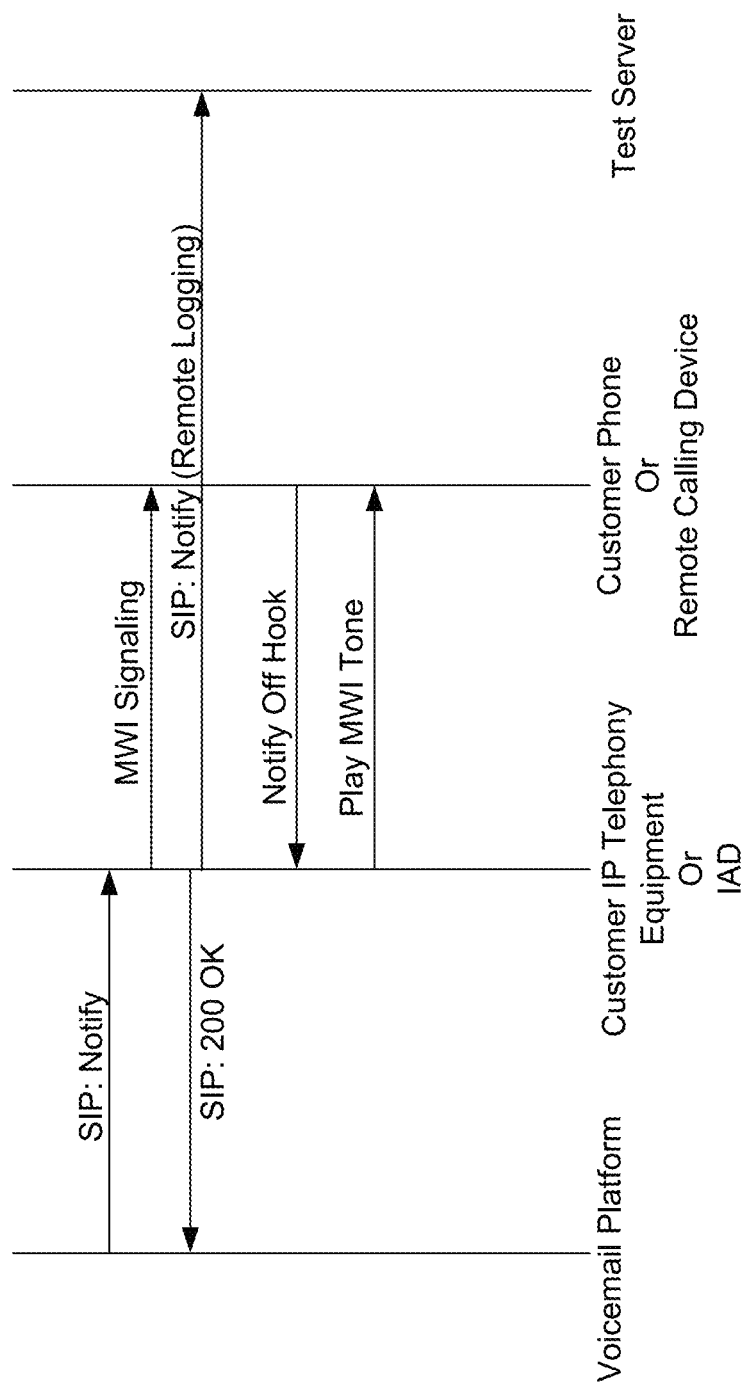
FIG. 6 is a SIP message diagram illustrating solicited communication messages associated with message-waiting notifications in accordance with embodiments of the invention.

Noncooperative networks utilize SIP messages to inform the customer equipment that a message is waiting. FIGS. 5 and 6 illustrate exemplary communication messages generated among the network elements involved in transmitting the audible and visual message-waiting notifications. FIG. 5 is a SIP message diagram illustrating unsolicited communication messages associated with message-waiting notification messages, and FIG. 6 is a SIP message diagram illustrating solicited communication messages associated with message-waiting notifications in accordance with embodiments of the invention. Alternatively, the communication messages illustrated in FIGS. 5 and 6 may be used in a cooperative network. FIGS. 5 and 6 represent a logical view of the customer equipment. Physically, the customer equipment may be comprised of an EMTA and accompanying analog phone or the customer equipment may be a Cisco IP telephone.

In FIG. 5, unsolicited SIP Notify messages are generated to notify a customer that messages are waiting in a voice mailbox on the voicemail platform. The voicemail platform generates a SIP notify message that includes a message-waiting, voice-messages, and remote-logging and notification-type headers. In an embodiment of the invention, the SIP Notify message may be constructed in accordance with draft-ietf-sipping-mwi-04 and the SIP messages may be transported via UDP. When new messages are waiting to be listened to, the headers will be populated to inform the customer. For instance, when a message is deposited to a voice mailbox, the SIP Notify message will include a yes or a boolean attribute in the messages-waiting header to indicate that new messages are waiting in the voice mailbox. Additionally, the SIP Notify message may include the voice-messages header that defines numerical attributes representing a number of new messages, a number of old messages, and a number of new and urgent messages. Also, the SIP notify messages may include a yes or a boolean attribute in the remote-logging header to indicate that remote-logging is active, and a location attribute to specifying an internet protocol (IP) address for a test-management server. When remote logging has been activated, a profile associated with the customer's voice mailbox, indicates that the voicemail platform includes a valid remote-logging header in the SIP Notify message. The mailbox phone number is configured in the VoIP switch to include the remote-logging header in the SIP Notify message. A configuration command is sent to the customer IP telephony equipment and the test management server to activate the remote logging feature and store the remote logging data in a database. Additionally, the notification-type header may be included in the SIP Notify message to define whether the notification is visual, audible or both.

After the voicemail platform generates and populates the SIP Notify message, the voicemail platform transmits the SIP Notify message to the VoIP switch. In turn, the VoIP switch communicates the SIP Notify message to the customer IP telephony equipment, such as a broadband modem or wireless router. The customer IP telephony equipment generates a SIP Ok message and communicates the SIP Ok message to VoIP switch, which, in turn, transmits the SIP Ok message to the voicemail platform. If an error occurred along the communication path either the VoIP switch or the customer IP telephony equipment will generate an error message. When the customer IP telephony equipment is configured to generate visual indications, in response to the SIP Notify message, the customer IP telephony equipment transmits a visual message-waiting notification to the customer equipment to display the visual indication to the customer equipment. When the remote-logging header specifies a location for the test-management sever, the SIP Notify message is transmitted to the test-management server, which may log the SIP Notify message. When the customer IP telephony equipment is configured to generate audible indications, the customer IP telephony equipment waits for the customer phone to generate an off-hook condition. In response, the customer IP telephony equipment generates messages specifying the cadence associated with audible notifications. Additionally, a remote calling device may transmit an off-hook condition to the IAD. The IAD receives the off-hook condition and determines the appropriate cadence tones and transmits messages specifying the cadence tones to the remote calling device to inform a technician about the type of message-waiting notifications associated with the customer equipment. The type may include visual, audible or both.

In FIG. 6, similar communication messages are generated when the customer is provisioned for message-waiting notifications and a subscribe-notify model is used to generate solicited SIP Notify messages. The subscribe model requires maintenance of SIP Notify preference information for each voice mailbox on the voicemail platform. Accordingly, when a new message is deposited in a voice mailbox that registered for SIP messages, the voicemail platform generates the SIP Notify messages and sends the SIP Notify message directly to the customer IP telephony equipment without communicating the SIP Notify Message to the VoIP switch. Accordingly, a customer is notified through visual or audible indications that a message is waiting in the voice mailbox associated with the customer. Moreover, the SIP Notify messages may be transmitted to an IAD to allow troubleshooting of the voicemail platform or customer equipment.

Figure 7:
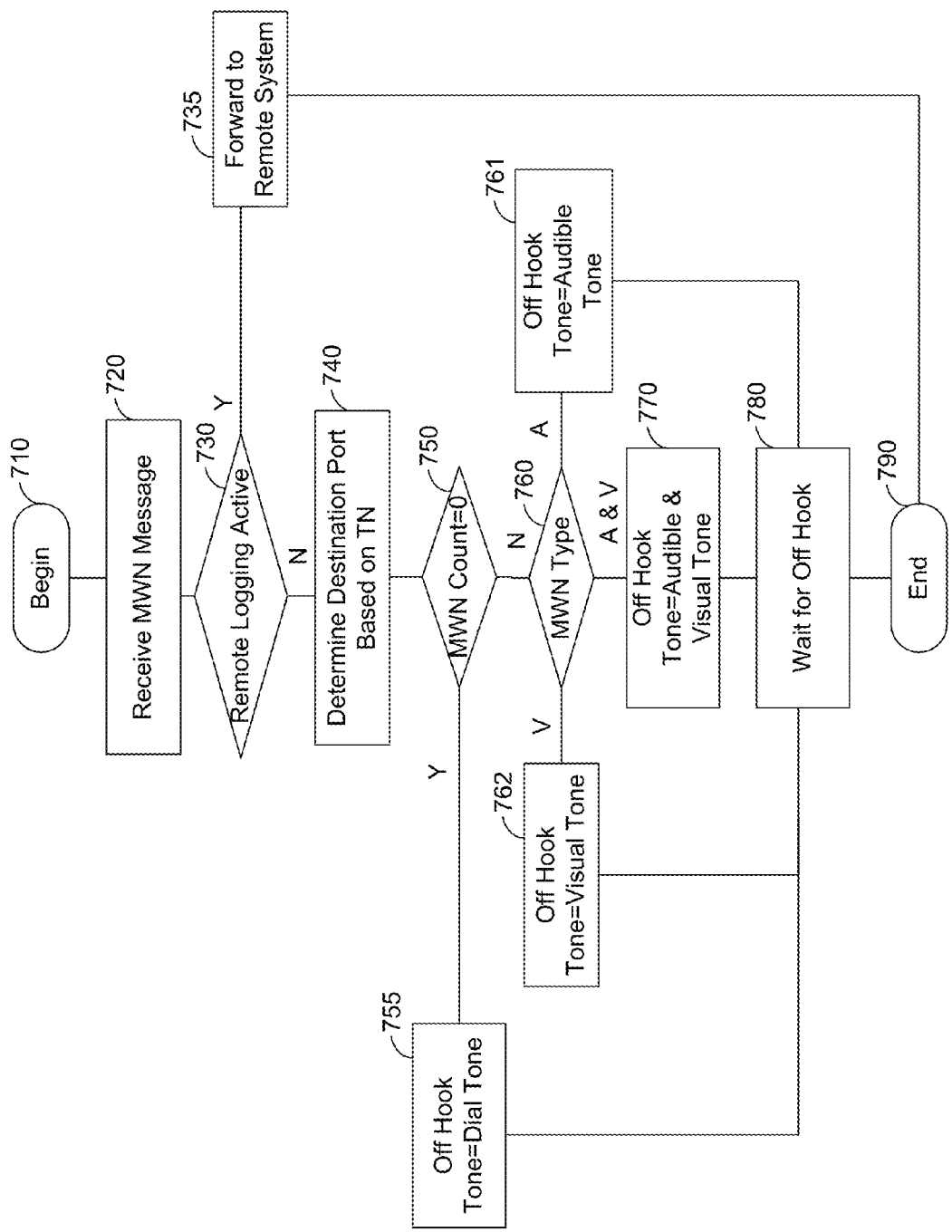
FIG. 7 is a flow diagram illustrating a method to provide message-waiting notifications in accordance with embodiments of the invention.

The IAD utilizes logic that enables a message processor to generate cadence tones in response to the SIP or NCS messages. FIG. 7 is a flow diagram illustrating a method to provide message-waiting notifications in accordance with embodiments of the invention. The method begins in step 710 when the IAD, which is coupled to the remote calling device initializes. In step 720, message-waiting notifications are received and stored by the IAD. In step 730 the message-waiting notifications are checked to determine whether remote logging is active. When remote logging is active, the message-waiting notifications are sent to a test-management server and the method ends in step 790. On the other hand, when remote logging is not active, and a remote technician has dialed into the remote calling device, the IAD determines the port on the remote calling device associated with the telephone number specified by the remote technician in step 740. The IAD checks a database storing the received message-waiting notifications to determine if a message-waiting notification having the specified telephone number is present in step 750. In step 750 when the number of new messages waiting for the user is zero, the IAD causes the remote calling device to generate a steady off-hook dial tone and the method ends in step 790. On the other hand, when new messages are waiting, the database is queried to determine the type of notification associated with the telephone number, in step 760. Based on the result of the query, the IAD causes the remote calling device to generate a visual tone, audible tone, or visual and audible tone to notify the remote technician that an appropriate message-waiting notification was generated. The generated tones are transmitted to the remote calling device, after an off-hook condition is generated in step 780. The method ends in step 790.

Accordingly, the IAD allows a remote testing of visual and audible message-waiting notifications. With reference to FIG. 1, the remote technician may place a test call using a wireless phone 111, such as Sprint PCS phone, or a plain-old-telephone system (POTS) telephone 155 at a test location through the public-switched-telephone network 154. The remote technician may utilize the wireless phone 111 to dial a residential VoIP phone number 153 assigned to the IAD 152 and remote calling device 151. A mobile switch center 112 receives the call request from the wireless phone 111 and routes the phone call to switching elements 120, which in turn routes the phone call to the IAD 152, which signals the remote calling device 151 to connect to the residential VoIP phone number 153. When the residential VoIP phone number 153 is not answered, the switching elements 120 check a profile associated with the residential VoIP phone number 153 to determine secondary treatment. The profile associated with the residential VoIP phone number 153 may specify that unanswered calls should be transmitted to the voicemail platform 110. The voicemail platform 110 answers the call and prompts the remote technician to leave a voice message. The remote technician records a voice message and the voicemail platform constructs and sends a message-waiting notification. The message-waiting notification is routed to the IAD 152. The IAD 152 returns an acknowledgement message and waits for an off-hook notification from a phone associated with the residential VoIP phone number 153. The remote technician may utilize POTS telephone 155 to dial the access number for the remote calling device 151. In an alternate embodiment of the invention, the remote technician may utilize wireless phone 111, or any other suitable calling device. The remote technician enters a personal-identification number (PIN) to authenticate when the remote calling device 151 answers the call. The remote technician hears authentication acknowledgement tones generated by the remote calling device 151 and enters a port number assigned to the residential VoIP phone number 153, such as "16." Upon seizing the port associated with the residential VoIP phone number 153, an off hook condition is sent to the IAD 152. In response, the IAD 152 plays the appropriate unique tones associated with the type of message-waiting notifications that the residential VoIP phone number 153 is configured to receive according to a service contract. For instance, if the residential VoIP phone number 153 is provisioned with visual message-waiting notifications, then the visual message-waiting notification tones are played to the remote technician prior to normal dial tone.

Figure 8:
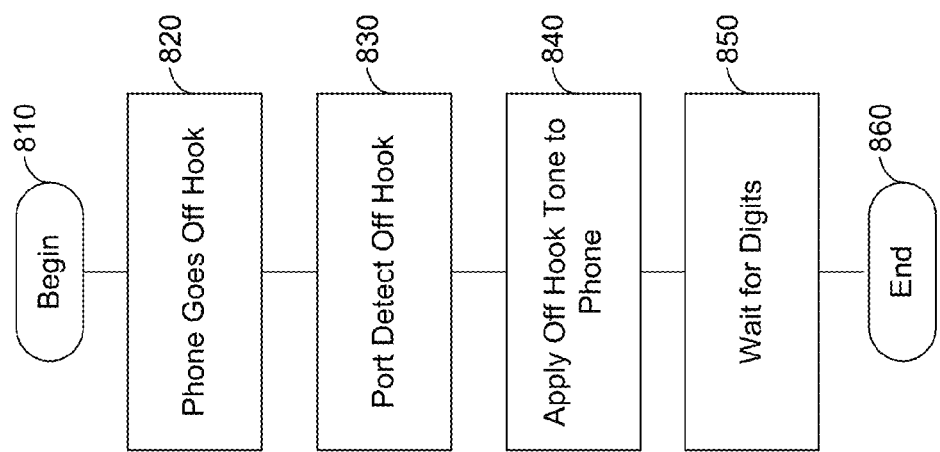
FIG. 8 is a flow diagram illustrating a method to apply one or more tones to a telephone receiver in accordance with embodiments of the invention.

FIG. 8 is a flow diagram illustrating a method to apply one or more tones to a receiver in accordance with embodiments of the invention. The method begins in step 810 when a remote technician tests a phone line. In step 820 the receiver of the phone is taken off-hook. In step 830, a remote-calling device accesses an appropriate port and forwards an off-hook notification and an IAD detects the off-hook condition at the port. The IAD selects the appropriate off-hook tone and applies the selected off-hook tone to receiver in step 840. The receiver waits for additional digits in step 850 and the method ends in step 860.

When the remote technician is testing the message-notifications, the IAD loads the message-notification logic to determine the appropriate status indication that should be generated based on the message-waiting notifications received by the IAD. The status indications may include cadence tones that represent, visual or audible message-waiting notifications. The IAD receives broadband signaling representing packetized message-waiting notifications on an Ethernet interface and converts the packetized message-waiting notifications to narrowband signaling that represents cadence tones. The conversion utilizes a database or profile stored on the IAD to determine the appropriate cadence tone mappings based on header information included in the packetized message-waiting notifications.

Figure 9:
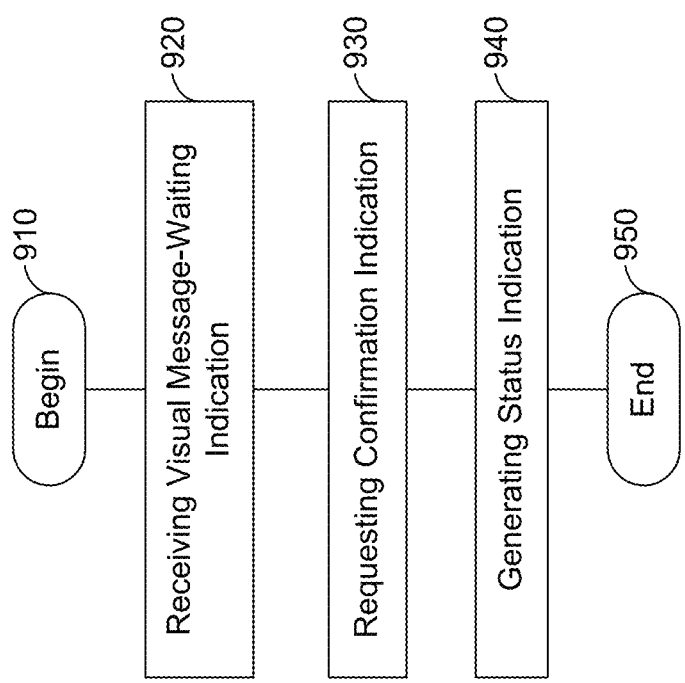
FIG. 9 is a flow diagram illustrating a method to generate message-waiting notifications in accordance with embodiments of the invention.

FIG. 9 is a flow diagram illustrating a method to generate message-waiting notifications in accordance with embodiments of the invention. The method begins in step 910, when the IAD loads logic associated with generating message-waiting notifications into the method into memory. In step 920, the IAD receives visual message-waiting notifications. The IAD processes the visual message-waiting notifications and generates a confirmation indication in step 930 and transmits the confirmation indication to the originating element. In response to an off-hook condition, the IAD generates the appropriate status indications to notify a remote technician that audible or visual message-waiting notifications are working properly in step 940. The method ends in step 950.

With reference to FIG. 1, in an alternate embodiment, an automated dialer (not shown) initiates calls to the remote calling device 151, authenticate, selects appropriate ports, listen to the tones, and report the results to a test-management server 160. The automated dialer automatically places calls to a group of residential VoIP phone numbers, assigned to broadband VoIP customer premise equipment (CPE) devices 130 and 140. Also, the switching elements 120 may be provisioned with VoIP phone numbers. The switching elements 120 may generate call setup information and connect to the CPE devices 130 and 140. When there is no answer at CPE devices 130 or 140, the switching elements determine whether voicemail service is associated with the group of residential VoIP phone numbers. The voicemail platform 110 answers the call for each residential VoIP phone number that is associated with a voice mailbox and a voice message is stored in the voice mailbox. In response, the voicemail platform 110 constructs and sends a message-waiting notification. The message-waiting notification is delivered to the switch elements 120, which routes the message-waiting notification to the broadband VoIP CPE 130 or 140 associated with each voice mailbox. The broadband VoIP CPE 130 or 140 returns an acknowledgement message to the switching elements 120 and checks the message-waiting notification to determines if remote logging is active or not. If remote logging is active, then the broadband VoIP CPE 130 or 140 forwards the message-waiting notification to the test-management server. If remote logging is not active, the broadband VoIP CPE 130 or 140 continues processing without forwarding the message-waiting notification. For instance, the broadband VoIP CPE 130 or 140 may deliver message-waiting notification to an analog phone, and the analog phone may generate either a visual or audible indication based on the type of the message-waiting notification. The analog phone may be provisioned to present a light or a cadence tone indication based on the type of message-waiting notification. Optionally, the broadband VoIP CPE 1303 or 140 may log a copy of the message-waiting notification for later extraction by the test-management server 160. Additionally, the broadband VOIP CPE may be a Cisco IP phone, a WIFI phone, or any other similar device capable of the above functions.

Figure 10:
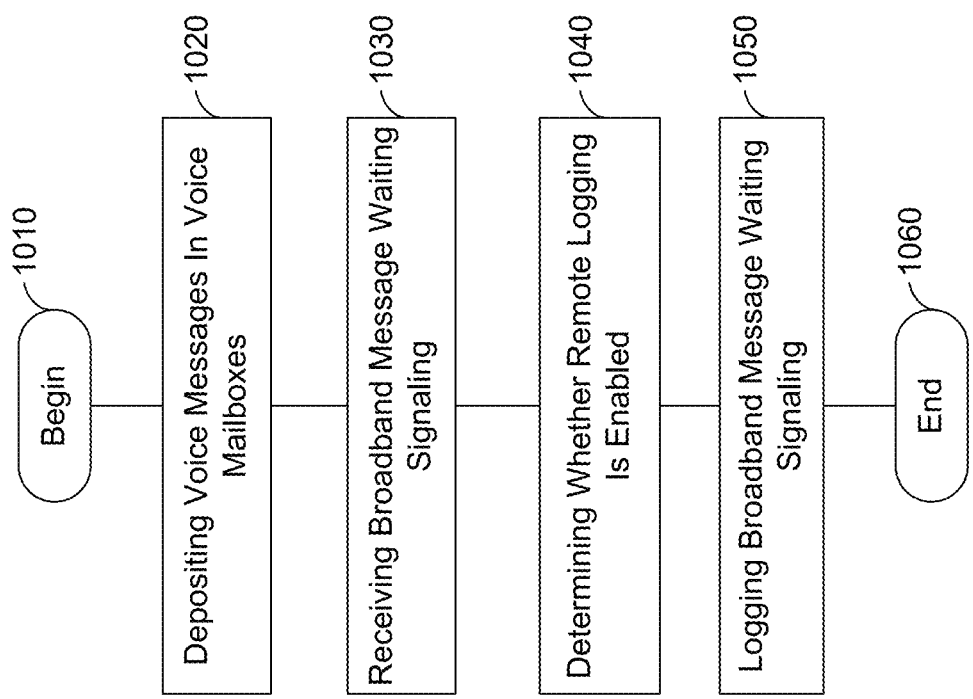
FIG. 10 is a flow diagram illustrating a method to automatically test a group of endpoints that receive message-waiting notifications.

FIG. 10 is a flow diagram illustrating a method to automatically test a group of VoIP endpoints that receive message-waiting notifications. The method begins in step 1010, when the automated dialer is initialized. In step 1020 the automated dialer deposits a voice message in voice mailboxes associated with VoIP endpoint having a voicemail service. In step 1030 the voicemail platform generates the broadband message-waiting signaling and routes the message-waiting signaling to the VoIP endpoint. The VoIP endpoints receive the broadband message-waiting notifications and utilize the broadband message-waiting notifications to determine whether remote logging is enabled in step 1040. When remote logging is enabled, the broadband message-waiting notifications are transmitted to the remote test-management server in step 1050. The method ends in step 1060.

In summary, remote testing of message-waiting notifications allows a technician to determine whether the customer equipment is the cause of the problem. An IAD and test management server provides the technician with the ability to remotely test VoIP endpoints. Additionally, costs associated with testing audible and visual message waiting is minimized when an automated dialer is utilized to check the message-waiting notifications.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the embodiments of the invention.

It will be understood that certain features and subcombinations are of utility and may be employed without reference to other features and subcombinations and are contemplated within the scope of the claims. Not all steps listed in the various figures need be carried out in the specific order described.

We claim:

1. A message indication testing device, comprising:
 a remote calling device comprising a first plurality of ports; and
 an integrated access device (IAD) comprising a second plurality of ports for connection to their associated first plurality of ports, wherein the IAD receives, via a connection of one of the first plurality of ports to one of the second plurality of ports, a message waiting notification to determine customer equipment receipt of the message waiting notification.

2. The message indication testing device of claim 1, wherein the IAD further comprises a message processor and a message waiting indication (MWI) database.

3. The message indication testing device of claim 2, wherein the message processor processes message waiting notification data received from a network to determine a type and a status of the message waiting notification data.

4. The message indication testing device of claim 2, wherein the MWI database stores a predetermined cadence for each type of notification.

5. The message indication testing device of claim 1, wherein the IAD troubleshoots a voicemail platform initiated by the message waiting notification.

6. The message indication testing device of claim 1, wherein the IAD troubleshoots customer equipment initiated by the message waiting notification.

7. The message indication testing device of claim 1, further comprising a message waiting notification visual or audible indicator.

8. A computer-implemented method of remotely testing message waiting notifications, the computer-implemented method comprising:
 receiving a phone call from a remote technician, wherein an associated phone number of the phone call is assigned to an integrated access device (IAD) coupled to a remote calling device;
 signaling the remote calling device via the IAD to connect to the associated phone number;
 routing a message waiting notification for the associated phone number from a voicemail platform to the IAD; and
 notifying the remote technician of a properly working status of the message waiting notification via the IAD.

9. The computer-implemented method of claim 8, further comprising:
 sending one or more notification tones associated with a type of the message waiting notification configured for the phone number to the remote technician via the IAD and the remote calling device.

10. The computer-implemented method of claim 8, wherein the message waiting notification comprises a session-initiated protocol message.

11. The computer-implemented method of claim 8, wherein the message waiting notification comprises a network based call signaling message.

12. The computer-implemented method of claim 8, wherein the routing further comprises: querying a message waiting indicator database to generate an appropriate cadence tone identification.

13. The computer-implemented method of claim 8, wherein the notifying utilizes a message processor of the IAD.

14. One or more non-transitory computer storage media storing computer readable instructions embodied thereon that when executed by a computing device, perform a method of remotely testing message waiting notifications, the method comprising:
 calling one or more phone numbers assigned to associated customer premise equipment (CPE) via an automated dialer;
 routing a message waiting notification to the CPE for each associated voice mailbox via one or more switch elements;
 forwarding the message waiting notification to a test management server via the CPE for active remote logging; and
 delivering the message waiting notification to an analog phone via the CPE for generation of an indication of the message waiting notification for inactive remote logging.

15. The one or more non-transitory computer storage media of claim 14, wherein the CPE comprises a cooperative network.

16. The one or more non-transitory computer storage media of claim 14, wherein the CPE comprises a non-cooperative network.

17. The one or more non-transitory computer storage media of claim 14, further comprising: logging a copy of the message waiting notification for later extraction by the test management server.

18. The one or more non-transitory computer storage media of claim 14, wherein the message waiting notification comprises a session-initiated protocol message.

19. The one or more non-transitory computer storage media of claim 14, wherein the message waiting notification comprises a network based call signaling message.

20. The one or more non-transitory computer storage media of claim 14, wherein the indication comprises one of a visual or audible indication.

* * * * *